United States Patent
Feria et al.

(10) Patent No.: US 10,084,531 B2
(45) Date of Patent: Sep. 25, 2018

(54) SYSTEM AND METHOD FOR ALLOCATING RESOURCES WITHIN A COMMUNICATION NETWORK

(71) Applicant: THE BOEING COMPANY, Chicago, IL (US)

(72) Inventors: Ying J. Feria, Manhattan Beach, CA (US); David Whelan, Newport Coast, CA (US); Mike T. Trujillo, El Segundo, CA (US); John M. Sullivan, Manhattan Beach, CA (US)

(73) Assignee: The Boeing Company, Chicago, IL (US)

( * ) Notice: Subject to any disclaimer, the term of this patent is extended or adjusted under 35 U.S.C. 154(b) by 226 days.

(21) Appl. No.: 14/840,890

(22) Filed: Aug. 31, 2015

(65) Prior Publication Data

US 2017/0063445 A1 Mar. 2, 2017

(51) Int. Cl.
*H04B 7/185* (2006.01)
*H04W 16/10* (2009.01)
*H04W 72/04* (2009.01)

(52) U.S. Cl.
CPC ..... *H04B 7/18513* (2013.01); *H04B 7/18504* (2013.01); *H04W 16/10* (2013.01); *H04W 72/0453* (2013.01)

(58) Field of Classification Search
CPC ............ H04B 7/18513; H04W 72/0453
See application file for complete search history.

(56) References Cited

U.S. PATENT DOCUMENTS

| | | | |
|---|---|---|---|
| 6,061,562 A * | 5/2000 | Martin | H01Q 3/242 455/431 |
| 2016/0254854 A1* | 9/2016 | Wharton | H04B 7/18519 455/12.1 |

OTHER PUBLICATIONS

Handwerk, "Google's Loon Project Puts Balloon Technology in Spotlight," National Geographic (http://news.nationalgeographic.com/content/news/en_US/news/2013/06/130618-google-balloon-wireless-communication-internet-hap-satellite-stratosphere-loon-project.html), published Jun. 18, 2013.

* cited by examiner

*Primary Examiner* — Joseph Dean, Jr.
(74) *Attorney, Agent, or Firm* — Joseph M. Butscher; The Small Patent Law Group, LLC (57) ABSTRACT

A communication network may include a satellite configured to provide a plurality of satellite cells within a satellite coverage area, and one or more unmanned aerial vehicles (UAVs) configured to fly within the satellite coverage area. Each UAV is configured to fly over one of the satellite cells. A resource allocation system may be configured to dynamically allocate at least a portion of a frequency spectrum between the satellite and the UAV(s). Each UAV provides a plurality of UAV cells within a satellite cell in response to the resource allocation system allocating the frequency spectrum (or portion thereof) to the UAV(s).

20 Claims, 4 Drawing Sheets

SYSTEM AND METHOD FOR ALLOCATING RESOURCES WITHIN A COMMUNICATION NETWORK

FIELD OF THE DISCLOSURE

Embodiments of the present disclosure generally relate to systems and methods for allocating resources within a communication network, and, more particularly, to systems and methods for allocating frequency spectrum between a satellite and one or more unmanned aerial vehicles of a communication network.

BACKGROUND OF THE DISCLOSURE

Various communication networks include satellites that provide spot beams or cells on a geographic area. A spot beam is a signal that is transmitted by an antenna and generally covers a limited geographic area on Earth. Spot beams allow satellites to transmit different data signals using a similar frequency. Because satellites typically have a limited number of available frequencies for use, one or more frequencies may be re-used with respect to different geographical locations in order to allow a greater number of channels to be utilized.

Medium Earth orbit (MEO) and geostationary/geosynchronous Earth orbit (GEO) satellites include phased array antennas that are used to provide coverage areas through multiple spot beams (such as hundreds of spot beams). The satellites may use frequency reuse patterns. In a frequency reuse pattern, frequencies allocated to a particular application are reused in a regular pattern of spot beams or cells. Frequency reuse increases both coverage and capacity. Adjacent cells use different frequencies. Notably, however, different cells that are distant from one another may operate using the same frequency. The distance between the two adjacent cells using the same frequency is great enough to prevent (or reduce to acceptable levels) any interference between the two cells.

Satellite spot beams or cells cover relatively large geographic areas with limited bandwidth. For example, a spot beam or cell may have a diameter between 80 to 400 km. Because each spot beam or cell is relatively large, one spot beam or cell may cover a densely populated area, while another spot beam or cell may cover a remote, rural area, for example. As can be appreciated, communication needs within a densely populated urban area are greater than those in sparsely populated rural areas. A spot beam that covers a densely populated area may be insufficient to meet data transmission demands within the area. As such, communication resources within the less populated areas may be underutilized, while there may simply not be enough communication resources within areas of higher density population.

Accordingly, a need exists for a system and method of efficiently allocating communication resources within a communication network.

SUMMARY OF THE DISCLOSURE

Certain embodiments of the present disclosure provide a communication network that may include a satellite configured to provide a plurality of satellite spot beams or cells (hereafter, the term "cell" refers to a spot beam or a cell) within a satellite coverage area, and one or more unmanned aerial vehicles (UAVs) configured to fly within the satellite coverage area. Each UAV is configured to fly over one of the satellite cells. A resource allocation system may be configured to dynamically allocate at least a portion of a frequency spectrum between the satellite and the UAV(s). Each UAV may provide a plurality of UAV cells within a satellite cell in response to the resource allocation system, thereby allocating at least a portion of the frequency spectrum to the UAV.

The resource allocation system may be configured to allocate at least a portion of the frequency spectrum from the satellite to the UAV(s) during periods of increased communication usage within at least one of the plurality of satellite cells. The portion of the frequency spectrum allocated to the UAV(s) may not interfere with a remaining portion of the frequency spectrum retained by the satellite.

In at least one embodiment, the plurality of UAV cells within a satellite cell may be equal to or greater than a total number of the plurality of satellite cells within the satellite coverage area. The frequency spectrum may include a frequency reuse pattern.

The satellite may be a low Earth orbit (LEO), medium Earth orbit (MEO), or geostationary Earth orbit (GEO) satellite. A first altitude of the satellite may be at least twenty times greater than a second altitude of the one or more UAVs.

Satellite frequency sub-spectrums of adjacent satellite cells may be different. Similarly, UAV frequency sub-spectrums of adjacent UAV cells may be different.

The resource allocation system may include a communication device configured to communicate with one or both of the satellite and the UAV(s), and a control unit configured to control operation of the resource allocation system. In at least one embodiment, the resource allocation system is onboard the satellite. In at least one other embodiment, the resource allocation system is onboard the UAV(s). In still another embodiment, a separate and distinct base station includes the resource allocation system.

Certain embodiments of the present disclosure provide a method of operating a communication network. The method may include using a plurality of satellite cells within a satellite coverage area, and operating one or more unmanned aerial vehicles (UAVs) within the satellite coverage area. The operating step may include operating the UAV(s) over one of the satellite cells. The method may also include dynamically allocating at least a portion of a frequency spectrum between a satellite and the UAV(s). The dynamically allocating step may include using a plurality of UAV cells within the one of the satellite cells in response to at least a portion of the frequency spectrum being allocated to the one or more UAVs.

DETAILED DESCRIPTION OF THE DISCLOSURE

The foregoing summary, as well as the following detailed description of certain embodiments will be better understood when read in conjunction with the appended drawings. As used herein, an element or step recited in the singular and preceded by the word "a" or "an" should be understood as not necessarily excluding the plural of the elements or steps. Further, references to "one embodiment" are not intended to be interpreted as excluding the existence of additional embodiments that also incorporate the recited features. Moreover, unless explicitly stated to the contrary, embodiments "comprising" or "having" an element or a plurality of elements having a particular property may include additional elements not having that property.

Embodiments of the present disclosure provide systems and methods of efficiently allocating communication resources within a communication network. Certain embodiments of the present disclosure provide systems and methods of providing narrower cells for densely populated areas, for example, to meet transmission demands.

In at least one embodiment, a particular communication spectrum is allocated between a satellite and an unmanned aerial vehicle (UAV), such as a drone. When the satellite is capable of providing coverage in an area, most or all of the communication resources (such as frequency spectrum, bandwidth, and the like) may be allocated to the satellite, while little or none of the communication resources may be allocated to the UAV. During periods of increased communication within a particular geographic area, the communication resources may be reallocated between the satellite and the UAV, so that a cell from the satellite is deactivated (or curtailed), and the communication resources originally allocated to the satellite cell are reallocated to the UAV. In this manner, frequency reuse capabilities of the UAV may be used to provide increased bandwidth over a densely populated area, for example.

Certain embodiments of the present disclosure provide a method of providing network communications that may include setting a UAV over a densely populated area (for example, the UAV flies over the densely populated area, such as through a repeating flight pattern), allocating a frequency spectrum normally allocated to a satellite to the UAV, providing communication services via the UAV, and reallocating to the satellite the frequency spectrum allowed to the UAV when the UAV is not over a densely populated over.

Certain embodiments of the present disclosure provide systems and methods of efficiently reusing a limited frequency resource in a densely populated area by providing smaller cells by a UAV that may include one or more phased array antennas. Each cell transmitted by the UAV may be less than 10 km in diameter, for example. To increase communication system capacity density, UAVs may reuse the satellite frequencies. All or a portion of the frequency spectrum originally allocated to a cell of a satellite may be reallocated to the UAV. The UAV may use the reallocated spectrum in a similar reuse plan, thereby providing a cell pattern of multiple smaller cells within a single large cell of a cell footprint of a satellite. Individuals within the footprint of both the UAV and the satellite may send and receive calls, data, and the like on an appropriate frequency or polarization within frequency assignments of the UAV or the satellite, for example. A sub-spectrum assignment of frequency to the UAV for cell-based reuse may be updated on a dynamic basis as communication demands change. For example, the UAV may be allocated all of the frequency originally assigned to the satellite cell, or a smaller fraction thereof depending on call/data density or geometric coverage.

A communication network may include a satellite that transmits multiple satellite cells, and a plurality of UAVs. Each UAV may operate within a single cell footprint of the satellite. Alternatively, one or more of the UAVs may be configured to operate between multiple cell footprints of the satellite.

Reusing satellite frequency with respect to UAVs may increase communication capacity density. Each UAV may cover a satellite cell with multiple UAV cells, such as 80 to 100 UAV cells (within the footprint of a single satellite cell), thereby increasing frequency reuse with respect to the original satellite cell multiple times, for example (such as 20 times in a four color reuse pattern of 80 cells). Therefore, the capacity in a satellite cell may be multiple times greater than if no UAV was used.

Figure 1:
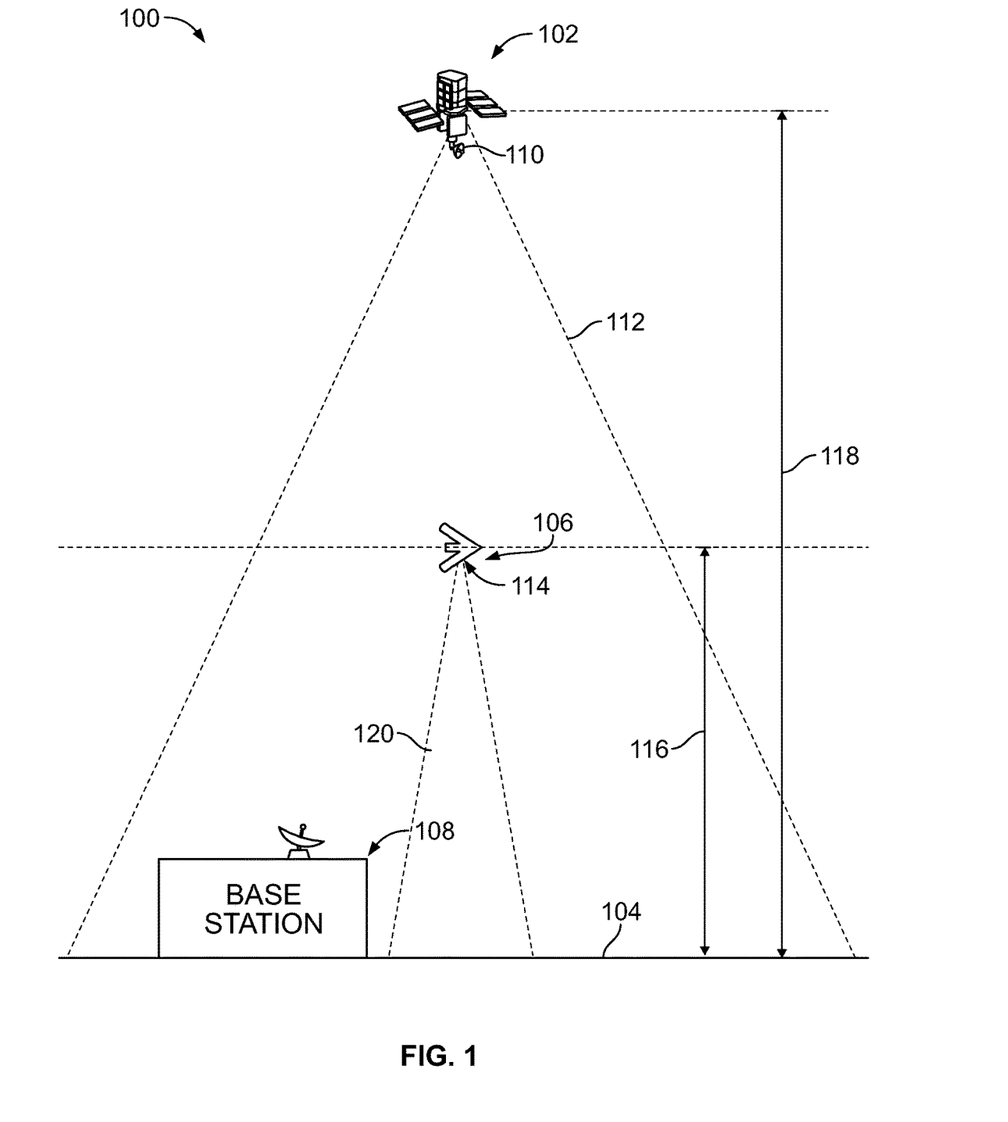
FIG. 1 is a diagrammatic representation of a simplified diagram of a communication network, according to an embodiment of the present disclosure.

FIG. 1 is a diagrammatic representation of a simplified diagram of a communication network 100, according to an embodiment of the present disclosure. The communication network 100 may include a satellite 102 that orbits above land 104, an unmanned aerial vehicle (UAV) 106, such as a drone, and a terrestrial base station 108. Alternatively, the base station 108 may be aboard watercraft, aircraft, or spacecraft. It is to be understood that the distances between the satellite 102 and the land 104, and the UAV and the land 104 shown in FIG. 1 are not drawn to scale.

The satellite 102 may be a medium Earth orbit (MEO) satellite that orbits around the Earth above low Earth orbit (LEO), which is 2000 km above the land 104, and below geostationary or geosynchronous orbit (GEO), which is 35,786 km above the land 104. In at least one other embodiment, the satellite 102 may be a LEO satellite. In at least one other embodiment, the satellite 102 may be a GEO satellite.

The satellite 102 may include one or more antennas 110, such as one or more phased array antennas, that are configured to provide a satellite coverage area 112 including a plurality of satellite cells. Each satellite cell may be relatively large, such as having a diameter between 80-400 km on a surface of the land 104.

The UAV 106 may be controlled by the base station 108 on the land 104. The UAV 106 may also include one or more antennas 114, such as one or more phased array antennas. The UAV 106 may fly above the land 104 at an altitude 116 that is substantially less than an altitude 118 of the satellite 102 above the land 104. For example, while the altitude 118 of the satellite 102 may be any of those noted above for LEO, MEO, and GEO satellites (or any altitudes therebetween), the altitude 116 of the UAV 106 may be between 20-100 km, for example. Alternatively, the altitude 116 of the UAV 106 may be less than 20 km, or greater than 100 km. In at least one embodiment, the altitude 118 of the satellite 102 is at least 100 times the altitude 116 of the UAV 106. Alternatively, the altitude 118 of the satellite 102 may be greater or lesser than 100 times the altitude 116 of the UAV 106. For example, the altitude 118 of the satellite 102 may be at least 20 times the altitude 116 of the UAV 106.

The UAV 106 is configured to provide a UAV coverage area 120 including a plurality of UAV cells. Each UAV cell may be substantially smaller than a satellite cell. For example, the coverage area 120 may include a plurality of UAV cells that fit within a single satellite cell of the satellite coverage area 112. In at least one embodiment, each UAV cell may be between 1-3 km in diameter on the land 104. Alternatively, each UAV cell may be less than 1 km, or greater than 3 km, in diameter on the land 104.

Figure 2:
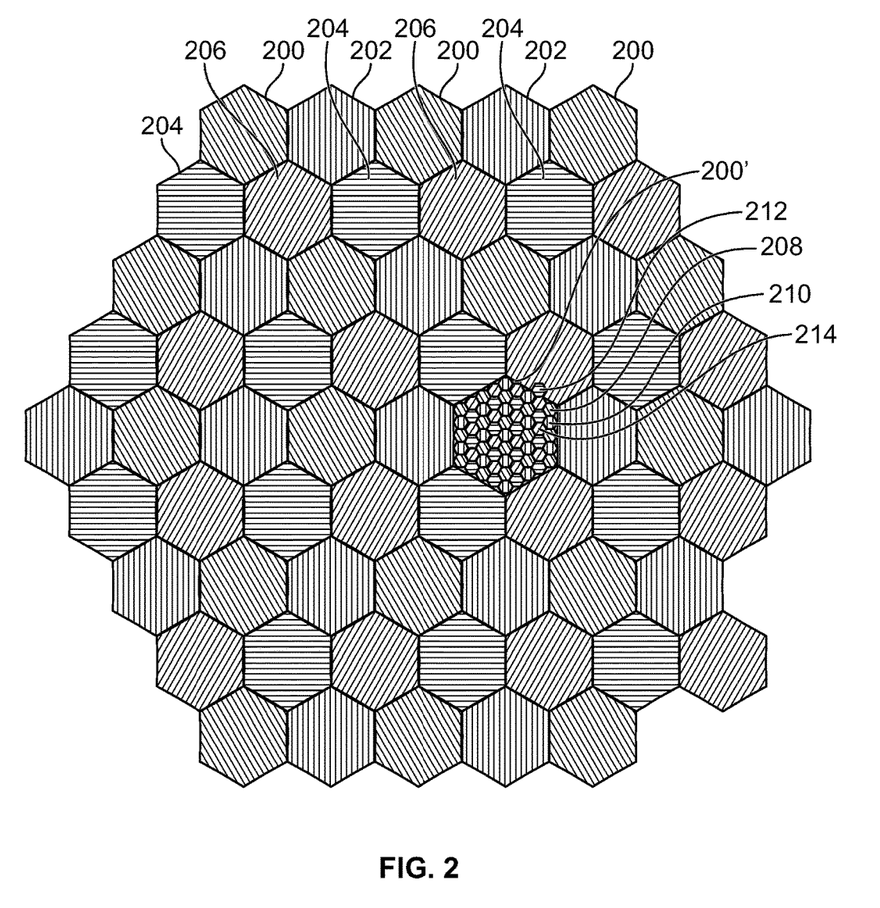
FIG. 2 is a diagrammatic representation of a plurality of satellite cells and a plurality of UAV cells within one of the satellite cells, according to an embodiment of the present disclosure.

FIG. 2 is a diagrammatic representation of a plurality of satellite cells 200, 202, 204, and 206 (that cover terrestrial areas on the ground, as indicated in FIG. 2) and a plurality of UAV cells 208, 210, 212, and 214 (that cover terrestrial areas on the ground, as indicated in FIG. 2) within one of the satellite cells 200', according to an embodiment of the present disclosure. Referring to FIGS. 1 and 2, the UAV cells 208, 210, 212, and 214 are provided by the UAV 106. The satellite cell 200' may cover a densely populated area, such as a city, that may include increased communication demands.

The satellite coverage area 112 may include more or less satellite cells 200, 202, 204, and 206 than shown. Each satellite cell 200, 202, 204, and 206 may utilize a different frequency. For example, the satellite cells 200, 202, 204, and 206 may utilize first, second, third, and fourth frequencies, respectively, each of which differs from one another. As shown in FIG. 2, the satellite 102 may employ a four color frequency reuse pattern (illustrated by the differing patterns of lines inside the hexagons representing each satellite cell). Alternatively, the satellite 102 may employ a color frequency reuse pattern that is greater or lesser than a four color frequency reuse pattern.

The UAV coverage area 120 may include more or less UAV cells 208, 210, 212, and 214 than shown. Further, the UAV coverage area 120 may be within a different satellite cell than the satellite cell 200'. Also, additional UAVs 106 may be used to provide UAV cells within additional satellite cells 200, 202, 204, and 206. Each UAV cell 208, 210, 212, and 214 may utilize a different frequency. For example, the UAV cells 208, 210, 212, and 214 may utilize first, second, third, and fourth frequencies, respectively, each of which differs from one another. The first, second, third, and fourth frequencies may be the same or different than the frequencies of the satellite cells 200, 202, 204, and 206. Similar to the satellite 102, the UAV 106 may employ a four color frequency reuse pattern (illustrated by the differing patterns of lines inside the small hexagons representing each UAV cell). Alternatively, the UAV 106 may employ a color frequency reuse pattern that is greater or lesser than a four color frequency reuse pattern.

The UAV 106 may fly a relatively short flight pattern or orbit over an area of a satellite cell 200, 202, 204, or 206. For example, if the UAV 106 provides UAV cells having a 2 km diameter, the UAV 106 may fly a circular, elliptical, or ovoid flight pattern over a central area of a satellite cell 200, 202, 204, or 206. The flight pattern may have a radius ranging from 2-3 km, for example. Alternatively, the flight pattern may have a radius less than 2 km or greater than 3 km.

Figure 3:
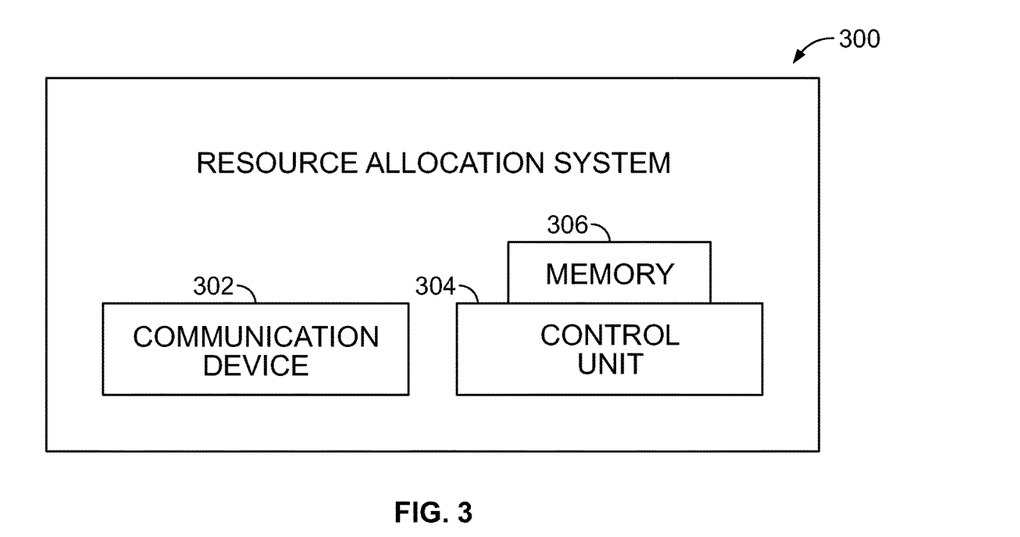
FIG. 3 is a diagrammatic representation of a block diagram of a resource allocation system, according to an embodiment of the present disclosure.

FIG. 3 is a diagrammatic representation of a block diagram of a resource allocation system 300, according to an embodiment of the present disclosure. The resource allocation system 300 may include a communication device 302 operatively coupled to a control unit 304 and a memory 306, which stores instructions for operating the resource allocation system 300. The control unit 304 may include the memory 306. Optionally, the control unit 304 may be operatively coupled to the memory 306. The communication device 302 may include one or more antennas, such as one or more phased array antennas. In at least one embodiment, the satellite 102 may include the resource allocation system 300. In at least one other embodiment, the base station 108 may include the resource allocation system 300. In at least one other embodiment, the UAV 106 may include the resource allocation system 300.

In operation, the resource allocation system 300 may communicate with the satellite 102 and/or the UAV 106 through the communication device 302. The resource allocation system 300 may also communicate with the base station 108, other terrestrial stations, locations, or the like, and/or other satellites, aircraft, UAVs, or the like, to monitor communication usage within the coverage area 112. Based on usage within the satellite cells, the control unit 304 may reallocate frequency spectrum between a UAV and a satellite.

As used herein, the term "controller," "control unit," "central processing unit," "CPU," "computer," or the like may include any processor-based or microprocessor-based system including systems using microcontrollers, reduced instruction set computers (RISC), application specific integrated circuits (ASICs), logic circuits, and any other circuit or processor capable of executing the functions described herein. Such are exemplary only, and are thus not intended to limit in any way the definition and/or meaning of such terms.

The control unit 304 executes a set of instructions that are stored in one or more storage elements (such as one or more memories), in order to process data. For example, the control unit 304 may include one or more memories, such as the memory 306. The storage elements may also store data or other information as desired or needed. The storage element may be in the form of an information source or a physical memory element within a processing machine.

The set of instructions may include various commands that instruct the control unit 304 (which may be or include a computer or processor) as a processing machine to perform specific operations such as the methods and processes of the various embodiments of the subject matter described herein. The set of instructions may be in the form of a software program. The software may be in various forms such as system software or application software. Further, the software may be in the form of a collection of separate programs or modules, a program module within a larger program or a portion of a program module. The software may also include modular programming in the form of object-oriented programming. The processing of input data by the processing machine may be in response to user commands, or in response to results of previous processing, or in response to a request made by another processing machine.

The diagrams of embodiments herein may illustrate one or more control or processing units. It is to be understood that the processing or control units may represent circuit modules that may be implemented as hardware with associated instructions (e.g., software stored on a tangible and non-transitory computer readable storage medium, such as a computer hard drive, ROM, RAM, or the like) that perform the operations described herein. The hardware may include state machine circuitry hardwired to perform the functions described herein. Optionally, the hardware may include electronic circuits that include and/or are connected to one or more logic-based devices, such as microprocessors, processors, controllers, or the like. Optionally, the control units may represent processing circuitry such as one or more of a field programmable gate array (FPGA), application specific integrated circuit (ASIC), microprocessor(s), a quantum computing device, and/or the like. The circuits in various embodiments may be configured to execute one or more algorithms to perform functions described herein. The one or more algorithms may include aspects of embodiments disclosed herein, whether or not expressly identified in a flowchart or a method.

As used herein, the terms "software" and "firmware" are interchangeable, and include any computer program stored in memory for execution by a computer, including RAM memory, ROM memory, EPROM memory, EEPROM memory, and non-volatile RAM (NVRAM) memory. The above memory types are exemplary only, and are thus not limiting as to the types of memory usable for storage of a computer program.

Referring to FIGS. 1-3, each of the satellite cells 200, 202, 204, and 206 may be relatively large in area. For example, each satellite cell 200, 202, 204, and 206 may be between 80-400 km in diameter in relation to an area on the ground. Total frequency may be divided into a plurality of sub-spectrums. For example, the total frequency may be divided into 28 sub-spectrums. If, for example, the satellite 102 provides a total of 700 satellite cells, and the frequency is divided into 28 sub-spectrums, the number of reuse of the total frequency spectrum may be 25 (that is, 700 satellite cells divided by 28 sub-spectrums). For the sake of simplicity and clarity, FIG. 2 only shows 62 satellite cells divided into 4 sub-spectrums. As noted, however, the coverage area 112 may include more or less satellite cells than shown, and the frequency reuse pattern may be greater than 4.

Returning to the example of 700 satellite cells and 28 frequency sub-spectrums, a total of 30 MHz (Mega Hertz) may be allocated for an entire coverage area of a satellite. Thus, approximately 1.07 MHz may be allocated for each of the 28 frequency sub-spectrums. As can be appreciated, with the 700 satellite cells, the total capacity of the satellite is limited. In one of the satellite cells, such as the satellite cell 200' shown in FIG. 2, there may be a high demand for communication service (for example, voice calls, data, and/or the like). As such, at least a portion of the frequency spectrum within the high demand satellite cell 200' may be re-allocated to the UAV 106 in order to provide the multiple UAV cells 208, 210, 212, and 214 within the geographic area or footprint of the satellite cell 200' in order to increase network capacity and capability within the geographic area or footprint of the satellite cell 200'.

The UAV 106 flies over the area of the satellite cell 200'. The resource allocation system 300 may allocate all or a portion of the frequency spectrum originally associated with the satellite cell 200' to the UAV 106. The antenna(s) 114 of the UAV 106 is configured to provide the multiple UAV cells 208, 210, 212, and 214. Returning to the original example of a satellite that provides 700 satellite cells, a UAV may be allocated frequency spectrum and may provide 700 UAV cells within an area of one satellite cell. Each UAV cell may be 1/700 the area of the satellite cell. As shown in FIG. 2, for example, if there are 62 total satellite cells, the UAV 106 may provide 62 UAV cells within the satellite cell 200'. Alternatively, the UAV 106 may provide a greater or lesser number of UAV cells 208, 210, 212, and 214 within an area of the single satellite cell 200' than the total number of satellite cells 200, 202, 204, and 206.

The spectrum or sub-spectrum originally allocated to the single satellite cell 200' may then be re-allocated among the total number of UAV cells 208, 210, 212, and 214 within the satellite cell 200'. In this manner, increased communication capacity and an increased amount of frequency reuse may be used within an area of a satellite cell, such as the satellite cell 200', by way of the resource allocation system 300 reallocating frequency spectrum between the satellite 102 and the UAV 106.

The satellite 102 and the UAV 106 may collaboratively cooperate to increase communication capacity and frequency reuse within an area of a satellite cell, such as the satellite cell 200'. The resource allocation system 300 may dynamically determine an amount of frequency spectrum to be allocated between the satellite 102 and the UAV 106. For example, the resource allocation system 300 may reallocate all of the frequency sub-spectrum originally assigned to the satellite cell 200' from the satellite 102 to the UAV 106. Optionally, the resource allocation system 300 may reallocate a fraction of the total frequency sub-spectrum originally assigned to the satellite cell 200' from the satellite 102 to the UAV 106. The frequency sub-spectrum apportioned to the UAV 106 may be a portion of the total frequency sub-spectrum originally assigned to the satellite cell 200'. If the satellite cell 200' retains a portion of the frequency sub-spectrum, the retained portion of the frequency sub-spectrum differs than the re-allocated portion of the frequency sub-spectrum of the UAV 106, so as to prevent, minimize, or otherwise reduce interference between the satellite 102 and the UAV 106.

For example, the resource allocation system 300 may monitor use within the satellite cell 200'. The satellite cell 200' may be originally allocated a total of 1.07 MHz. During peak periods of communication with the satellite cell 200', the resource allocation system 300 may reallocate 90% of the bandwidth of the frequency sub-spectrum to the UAV 106, which may then apportion the reallocated bandwidth among the UAV cells 208, 210, 212, and 214. The resource allocation system 300 may ensure that 10% of the bandwidth of the frequency sub-spectrum remains with the satellite 102 in relation to the satellite cell 200'. The retained portion of frequency sub-spectrum by the satellite 102 may be used for emergencies, for example.

In short, embodiments of the present disclosure may monitor communication within a coverage area of a satellite. In densely populated areas having high communication demands, for example, most or all of the bandwidth of a frequency spectrum or sub-spectrum originally allocated to one or more satellite cells may be reallocated to one or more UAVs flying over areas of satellite cells. In this manner, communication capacity and frequency reuse may be increased within an area of a satellite cell by reallocating frequency spectrum, or a portion thereof (such as a frequency sub-spectrum), from the satellite to one or more UAVs.

As noted above, the communication network 100 may include more UAVs than shown. For example, a separate and distinct UAV 106 may be assigned to additional satellite cells 200, 202, 204, and 206. Optionally, a UAV 106 may be assigned to less than each of the satellite cells 200, 202, 204, and 206, such as only those in densely-populated urban areas.

The resource allocation system 300 may monitor the satellite 102 and the UAV(s) 106 to dynamically allocate communication resources, such as frequency spectrum, therebetween. If the UAV 106 fails (such as being unable to transmit or receive data, unable to fly, or the like), the resource allocation system 300 may reallocate frequency sub-spectrum back to the satellite 102. As another example, during a handover from a first UAV to a second UAV (such as when the first UAV needs to be refueled and/or repaired), the resource allocation system 300 may reallocate the frequency sub-spectrum back to the satellite 102 during the handover.

As explained above, embodiments of the present disclosure provide systems and methods of allocating at least a portion of frequency spectrum between a satellite and one or more UAVs in a non-interfering manner. A frequency reuse pattern may be shared and allocated between the satellite and the UAVs. Embodiments of the present disclosure provide systems and methods of dynamic bandwidth allocation between a satellite and one or more UAVs.

Figure 4:
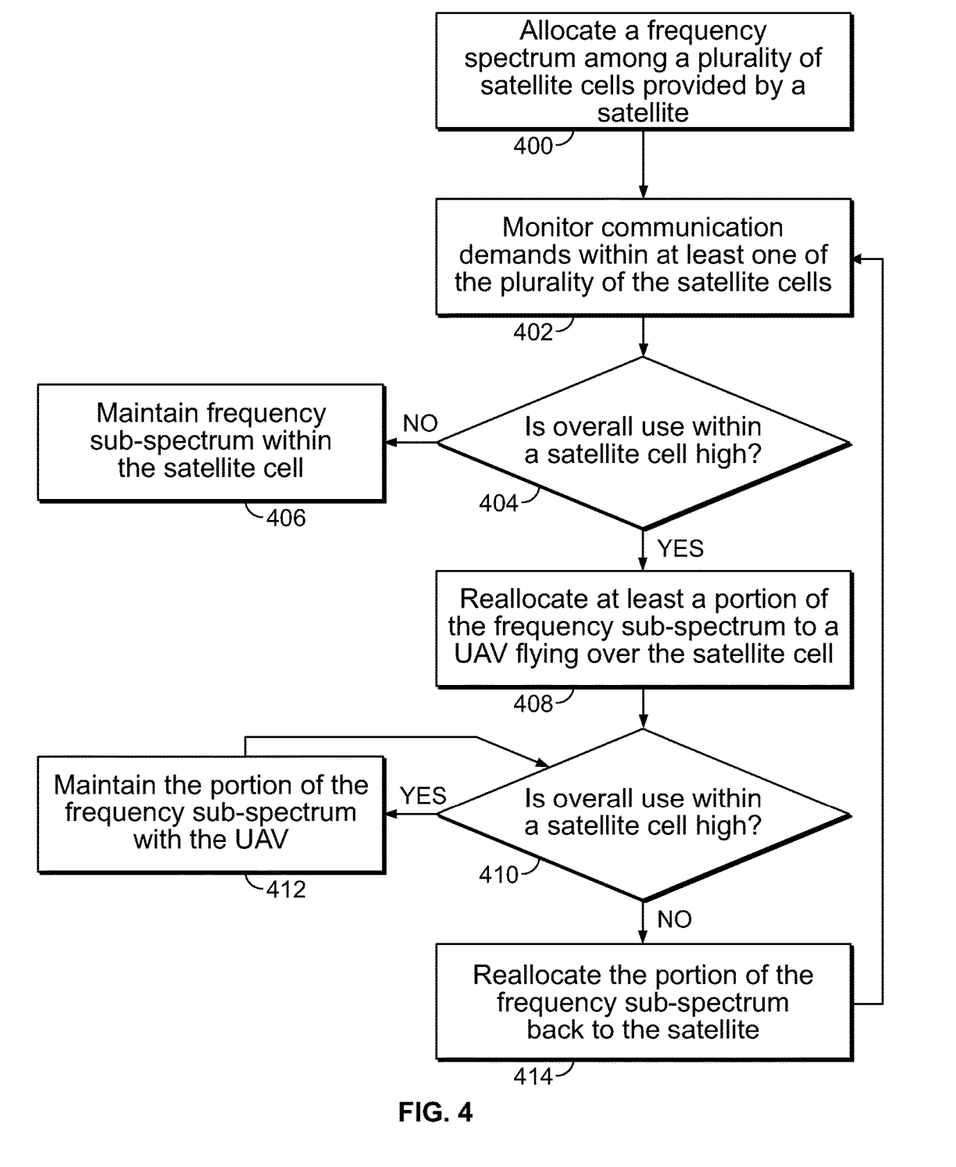
FIG. 4 illustrates a flow chart of a method of allocating resources within a communication network, according to an embodiment of the present disclosure.

FIG. 4 illustrates a flow chart of a method of allocating resources within a communication network, according to an embodiment of the present disclosure. The method begins at 400, in which a frequency spectrum is allocated among a plurality of satellite cells provided by a satellite. For example, the frequency spectrum may be subdivided into a plurality of frequency sub-spectrums, which may be allocated to separate and distinct satellite cells, such that each satellite cell may be assigned a separate, distinct, and unique frequency sub-spectrum. At 402, communication demands within at least one of the plurality of cells is monitored, such as by a resource allocation system, which may be aboard the satellite, a land-based station, a UAV, and/or the like.

At 404, it is determined if overall communication use within a satellite cell is high. For example, the satellite cell may be within a densely-populated area, such as an urban area, and the time of day may be in the middle of a business day. If it is determined that use is not high (such as at 3 AM on a Tuesday), then the frequency sub-spectrum is maintained at an original allocation at 406. If, however, the overall communication use is high, at 408 a least a portion of the frequency sub-spectrum originally assigned to the satellite cell is reallocated to a UAV flying over the satellite cell. Then, at 410, it is determined if overall communication use within the satellite cell is still high at 410. If the overall communication use is still high, the method proceeds to 412, in which the portion of the frequency sub-spectrum is maintained with the UAV. The method then returns to 410.

If, however, the overall communication use within the satellite cell is not high, the method proceeds from 410 to 414, in which the portion of the frequency sub-spectrum that was re-allocated to the UAV is re-allocated back to the satellite. The method then returns to 402.

Referring to FIGS. 1-4, embodiments of the present disclosure provide systems and methods for efficiently allocating communication resources within a communication network.

While various spatial and directional terms, such as top, bottom, lower, mid, lateral, horizontal, vertical, front and the like may be used to describe embodiments of the present disclosure, it is understood that such terms are merely used with respect to the orientations shown in the drawings. The orientations may be inverted, rotated, or otherwise changed, such that an upper portion is a lower portion, and vice versa, horizontal becomes vertical, and the like.

As used herein, a structure, limitation, or element that is "configured to" perform a task or operation is particularly structurally formed, constructed, or adapted in a manner corresponding to the task or operation. For purposes of clarity and the avoidance of doubt, an object that is merely capable of being modified to perform the task or operation is not "configured to" perform the task or operation as used herein.

It is to be understood that the above description is intended to be illustrative, and not restrictive. For example, the above-described embodiments (and/or aspects thereof) may be used in combination with each other. In addition, many modifications may be made to adapt a particular situation or material to the teachings of the various embodiments of the disclosure without departing from their scope. While the dimensions and types of materials described herein are intended to define the parameters of the various embodiments of the disclosure, the embodiments are by no means limiting and are exemplary embodiments. Many other embodiments will be apparent to those of skill in the art upon reviewing the above description. The scope of the various embodiments of the disclosure should, therefore, be determined with reference to the appended claims, along with the full scope of equivalents to which such claims are entitled. In the appended claims, the terms "including" and "in which" are used as the plain-English equivalents of the respective terms "comprising" and "wherein." Moreover, the terms "first," "second," and "third," etc. are used merely as labels, and are not intended to impose numerical requirements on their objects. Further, the limitations of the following claims are not written in means-plus-function format and are not intended to be interpreted based on 35 U.S.C. § 112(f), unless and until such claim limitations expressly use the phrase "means for" followed by a statement of function void of further structure.

This written description uses examples to disclose the various embodiments of the disclosure, including the best mode, and also to enable a person skilled in the art to practice the various embodiments of the disclosure, including making and using any devices or systems and performing any incorporated methods. The patentable scope of the various embodiments of the disclosure is defined by the claims, and may include other examples that occur to those skilled in the art. Such other examples are intended to be within the scope of the claims if the examples have structural elements that do not differ from the literal language of the claims, or if the examples include equivalent structural elements with insubstantial differences from the literal language of the claims.

What is claimed is:

1. A communication network, comprising:
   a satellite configured to provide a plurality of satellite cells within a satellite coverage area;
   one or more unmanned aerial vehicles (UAVs) configured to fly within the satellite coverage area, wherein each of the one or more UAVs is configured to fly over one of the satellite cells; and
   a resource allocation system configured to dynamically allocate at least a portion of a frequency spectrum between the satellite and the one or more UAVs, wherein the one or more UAVs provide a plurality of UAV cells within the one of the satellite cells in response to the resource allocation system allocating the at least a portion of the frequency spectrum to the one or more UAVs.

2. The communication network of claim 1, wherein the resource allocation system is configured to allocate the at least a portion of the frequency spectrum from the satellite to the one or more UAVs during periods of increased communication usage within at least one of the plurality of satellite cells.

3. The communication network of claim 1, wherein portions of the frequency spectrum allocated between the one or more UAVs and the satellite do not interfere with one another.

4. The communication network of claim 1, wherein the plurality of UAV cells within the one of the plurality of satellite cells is equal to or greater than a total number of the plurality of satellite cells within the satellite coverage area.

5. The communication network of claim 1, wherein the frequency spectrum comprises a frequency reuse pattern.

6. The communication network of claim 1, wherein the satellite comprises one of a low Earth orbit (LEO), medium Earth orbit (MEO), or geostationary Earth orbit (GEO) satellite.

7. The communication network of claim 1, wherein a first altitude of the satellite is at least twenty times greater than a second altitude of the one or more UAVs.

8. The communication network of claim 1, wherein satellite frequency sub-spectrums of adjacent satellite cells are different, and wherein UAV frequency sub-spectrums of adjacent UAV cells are different.

9. The communication network of claim 1, wherein the resource allocation system comprises:
   a communication device configured to communicate with one or both of the satellite and the one or more UAVs; and
   a control unit configured to control operation of the resource allocation system.

10. The communication network of claim 1, wherein the resource allocation system is onboard the satellite.

11. The communication network of claim 1, wherein the resource allocation system is onboard the one or more UAVs.

12. The communication network of claim 1, further comprising a base station, wherein the base station includes the resource allocation system.

13. A method of operating a communication network, the method comprising:
   operating one or more unmanned aerial vehicles (UAVs) within a satellite coverage area, wherein the operating comprises operating each of the one or more UAVs over one of a plurality of satellite cells; and
   dynamically allocating at least a portion of a frequency spectrum between a satellite and the one or more UAVs, wherein the dynamically allocating comprises using a plurality of UAV cells within the one of the plurality of satellite cells in response to the at least a portion of the frequency spectrum being allocated to the one or more UAVs.

14. The method of claim 13, wherein the dynamically allocating comprises reallocating the at least a portion of the frequency spectrum from the satellite to the one or more UAVs during periods of increased communication usage within at least one of the plurality of satellite cells.

15. The method of claim 14, wherein the dynamically allocating further comprises dynamically allocating non-interfering portions of the at least portion of the frequency spectrum between the one or more UAVs and the satellite.

16. The method of claim 13, wherein satellite frequency sub-spectrums of adjacent satellite cells are different, and wherein UAV frequency sub-spectrums of adjacent UAV cells are different.

17. A communication network, comprising:
   a satellite at a first altitude above a land surface, wherein the satellite is configured to provide a plurality of satellite cells within a satellite coverage area;
   one or more unmanned aerial vehicles (UAVs) configured to fly at a second altitude above the land surface within the satellite coverage area, wherein the first altitude is at least twenty times greater than the second altitude, wherein each one of the one or more UAVs is configured to fly over one of the satellite cells; and
   a resource allocation system configured to dynamically allocate at least a portion of a frequency spectrum having a frequency reuse pattern between the satellite and the one or more UAVs, wherein the one or more UAVs provide a plurality of UAV cells within the one of the satellite cells in response to the resource allocation system allocating the at least a portion of frequency spectrum to the one or more UAVs, wherein the plurality of UAV cells within the one of the satellite cells is equal to or greater than a total number of the plurality of satellite cells within the satellite coverage area, and wherein the resource allocation system is configured to allocate non-interfering portions of the frequency spectrum between the satellite and the one or more UAVs during periods of increased communication usage within at least one of the plurality of satellite cells.

18. The communication network of claim 17, wherein the resource allocation system comprises:
   a communication device configured to communicate with one or both of the satellite and the one or more UAVs; and
   a control unit configured to control operation of the resource allocation system.

19. The communication network of claim 17, wherein the resource allocation system is onboard the satellite.

20. The communication network of claim 17, wherein the resource allocation system is onboard the one or more UAVs.

* * * * *